(12) United States Patent
Baecker et al.

(10) Patent No.: US 8,543,448 B2
(45) Date of Patent: Sep. 24, 2013

(54) PARTITIONING PRODUCT FEATURES

(75) Inventors: Oliver Baecker, St. Gallen (CH);
Thomas Odenwald, Redwood City, CA (US); Harald Weppner, Redwood City, CA (US)

(73) Assignee: SAP AG, Walldorf (DE)

( * ) Notice: Subject to any disclaimer, the term of this patent is extended or adjusted under 35 U.S.C. 154(b) by 993 days.

(21) Appl. No.: 12/118,112

(22) Filed: May 9, 2008

(65) Prior Publication Data

US 2009/0281848 A1    Nov. 12, 2009

(51) Int. Cl.
*G06Q 10/00* (2012.01)

(52) U.S. Cl.
USPC ........................................................ 705/7.37

(58) Field of Classification Search
USPC ........................................................ 705/7.37
See application file for complete search history.

(56) References Cited

U.S. PATENT DOCUMENTS

2004/0267676 A1* 12/2004 Feng et al. .................... 705/400

OTHER PUBLICATIONS

Serguei Netessine and Sergei Savin, "Revenue Management Through Dynamic Cross-Selling in E-Commerce Retailing," Jul. 2005.*

Anil Kaul and Vithala Rao, "Research for PRoduct Positioning and Design Decisions: An Integrative Review," Nov. 1994.*

Wagner, David B., "Dynamic Programming", *The Mathematica Journal*, vol. 5, Issue 4 Fall 1995., (Sep. 1, 1995),42-51.

* cited by examiner

*Primary Examiner* — R. David Rines
*Assistant Examiner* — Amanda Gurski
(74) *Attorney, Agent, or Firm* — Schwegman Lundberg & Woessner, P.A.

(57) ABSTRACT

Apparatus, systems, and methods operate to partition a product feature set into a set of included features and a set of feature upselling candidates determined by a corresponding set of decision variables. The decision variables can be determined, in turn, by maximizing a profit function comprising a sum of first mathematical products (each product including profit, probability of sale, and a decision variable) over the product feature set, subject to the condition that a sum of second mathematical products (each product including feature utility and a decision variable) over the product feature set is less than or equal to the utility of the product feature set combined with a base product, minus the utility of a competing product. Operations may include designating an initial sales product configuration as a combination of a base product and the set of included features. Additional apparatus, systems, and methods are disclosed.

24 Claims, 6 Drawing Sheets

```
! code for solving the feature upselling 0-1 Knapsack problem
! using a branch-and-bound algorithm model featurePartitioning
uses "mmxprs"; !gain access to the Xpress-Optimizer solver ! parameters section
parameters
    datafile = 'data/featureData.dat'
end-parameters ! declarations section
declarations
    n: integer  ! amount of features
    U_competitors: real    ! use of competing embedded systems
    U_own_system: real    ! use of own embedded system incl all
    features
    Objective:linctr
end-declarations ! initialize fixed values first
initializations from datafile
    n U_competitors U_own_system
end-initializations ! these variables depend on the previous initialization
declarations
    r: array(1..n) of real ! additional revenue ri for a feature upselling of
    feature i with i = 1..n
    c: array(1..n) of real ! cost ci for a feature i with i = 1..n
    p: array(1..n) of real ! probability to sell feature i
    u: array(1..n) of real ! additional use ui for incorporating feature i with i =
    1..n
    x: array(1..n) of mpvar ! feature i is part of the embedded system or not with
    i = 1..n
end-declarations initializations from datafile
```

[CONTINUED FROM FIG. 2]

/— 200

*r c p u*
*end-initializations*

304 — *max_profit := sum(i in 1..n) (r(i) − c(i)) * p(i) * x(i)*

308 — *competition := sum(i in 1..n) u(i) * x(i) <= U_own_system − U_competitors*

! decision variables are binary
*forall(i in 1..n) f(i) is_binary*

! maximize the potential maximal profit
*maximize(max_profit)*
   ! write results to console
*writeln("Results of the feature partitioning problem:\n")*
316 — *writeln("The maximal possible profit is ", getobjval, "\n")*
*writeln("The decision variables are:\n")*
320 — *forall(i in 1..n) writeln("feature(",i,") = ", getsol(f(i)))*

*end-model*

/— 300

! input data for solving the feature upselling 0-1 Knapsack problem
! using a branch-and-bound algorithm 324 ⎧ *n:*               2
      *r:*               *[400 350]*
      *c:*               *[75 125]*
      *p:*               *[0.6 0.8]*
      *u:*               *[23 18]*
      *U_competitors:*     65
⎩ *U_own_system:*     *100*

FIG. 3

PARTITIONING PRODUCT FEATURES

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office files or records, but reserves all other rights whatsoever. Copyright 2008 SAP AG.

BACKGROUND

Embedded systems can be sold as a set of hardware and software components. Such systems are increasingly connected to networks, enabling the extension of embedded software (ESW) features by leveraging computer network technologies at a relatively low cost. Thus, it has become feasible to partition the total functional capabilities of an embedded system into sets of ESW features, where some of the features are sold with the base product as part of the initial sale, and some are withheld, to be sold to the consumer at a later time as an upgrade to the configuration originally purchased. This process is sometimes referred to as "feature upselling." The question for the vendor of embedded systems then becomes: which features out of the complete feature set should be sold as part of the initial sales product configuration, and which should be held back as feature upselling candidates?

BRIEF DESCRIPTION OF THE DRAWINGS

FIGS. 2 and 3 illustrate a listing of code and data that can be used to partition product features according to various embodiments.

DETAILED DESCRIPTION

An example embodiment proposes partitioning a product feature set associated with a base product into a set of included features and a set of feature upselling candidates. Membership in the set of feature upselling candidates is determined by a corresponding set of decision variables, which are determined, in turn, by maximizing a profit function, subject to certain conditions.

The profit function comprises a sum of first mathematical products (each of the first products including profit, probability of sale, and a decision variable) over the product feature set, subject to a side condition that a sum of second mathematical products (each of the second products including feature utility and a decision variable) over the product feature set is less than or equal to the utility of the base product augmented by the entire product feature set, minus the utility of a competing product. The term "mathematical product" is used herein to denote the multiplication of two or more values, and to avoid confusion with the term "product" that denotes a tangible good or service, or intangible good (e.g., software) or service that can be bought and sold. An example of a product is a base product, defined previously. Once partitioning is complete, the initial sales product configuration can be designated as a combination of the base product and the set of included features.

Figure 1:
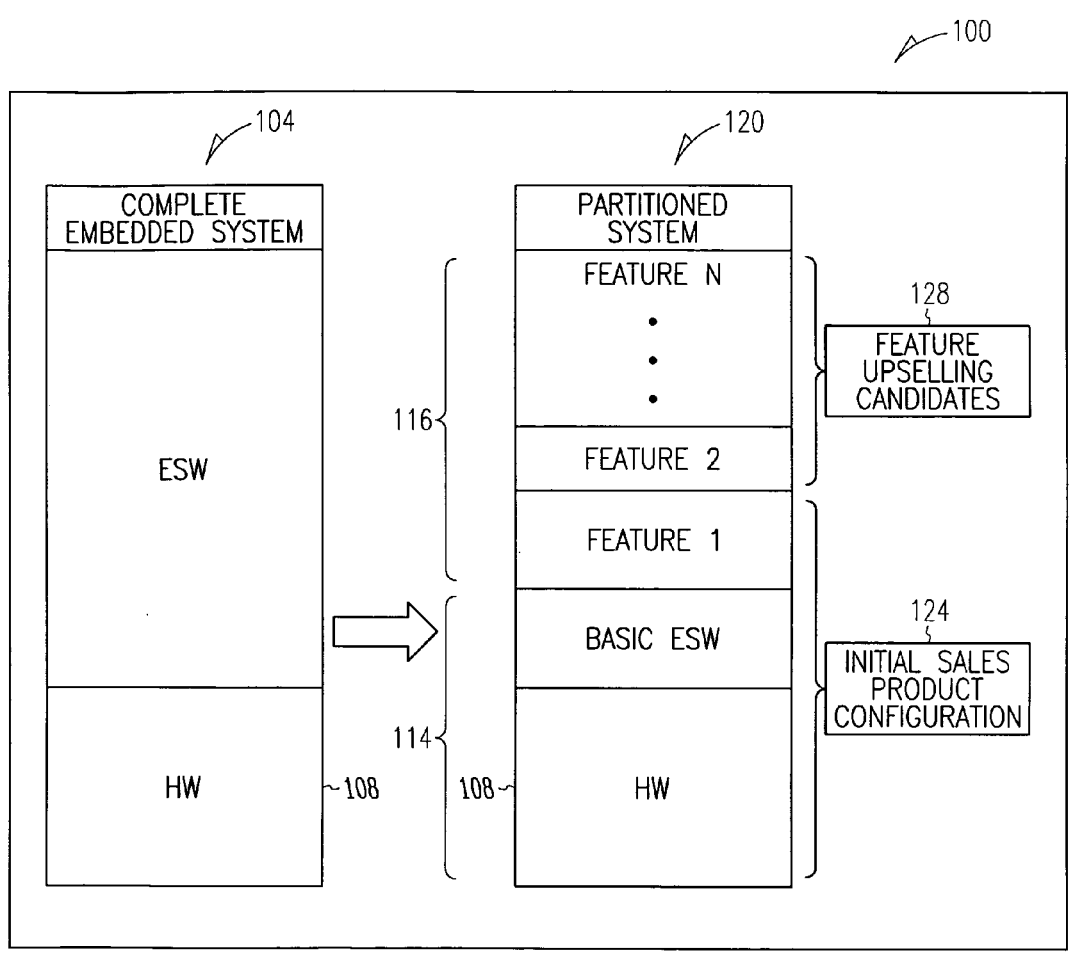
FIG. 1 is a diagram illustrating a product feature set associated with a base product, including partitioning the product features according to various embodiments.

FIG. 1 is a diagram 100 illustrating a product feature set 116 associated with a base product 114, including partitioning the product features according to various embodiments. In the traditional model used for selling embedded systems, or any other base products that offer a selection of features, an embedded system 104 is described as a combination offering hardware 108 and ESW 110. As part of the partitioning process, the ESW 110 of the traditional model is split into a basic ESW component 112 and n additional embedded software features that form a product feature set 116 according to the feature partitioning model of the partitioned system 120.

In the traditional model, the functionality of the monolithic ESW 110 block is extended by software upgrades, which are costly if not automated. In the feature partitioning model, new functionality is provided by incorporating additional features, or feature upselling candidates 128. As part of the transition from the traditional model to the feature partitioning model, the share of basic ESW 112 is reduced. However, up to n additional features feature_1, feature_2, . . . , feature_n extend the functional range of the partitioned system 120 that, as a base product 114, includes only the basic ESW 112 in the feature partitioning model.

For the purposes of this document, a "base product" is a product that can be sold with one or more associated partitionable features forming part of the larger product feature set. The base product (e.g., the combination of hardware 108 and the basic ESW 112) is independently functional, but is normally sold with at least one of its associated partitionable features (e.g., feature feature_1) to make up the initial sales product configuration 124.

"Basic embedded software" or "basic ESW" denotes software components and services of an embedded system which interface with its hardware components and enable application behavior. The basic ESW consists of generic building blocks that afford basic functionality and enable embedded system hardware 108 to operate properly. Thus an example of basic ESW is basic ESW 112.

The "product feature set" is the entire set of partitionable features that are selected for addition to a base product. This includes those features that are part of the initial sales product configuration (i.e., the set of included features), as well as all features that can be added to the initial sales product configuration after it has been sold, as part of feature upselling efforts (i.e., the set of feature upselling candidates).

An "embedded software feature" or "ESW feature" is an additional software component and/or service which builds on top of the basic ESW. An ESW feature provides more sophisticated application behavior and can be removed from an embedded system that has basic ESW without restraining its basic functional capability. ESW features can be incorporated into an existing embedded system to increase its functional range. Thus, examples of ESW features include those features feature_1, feature_2, . . . , feature_n.

Feature "profit" is the profit derived from selling one of the features in the product feature set. The profit is usually determined by the difference between sales revenue and the costs of production/implementation for a feature.

The "initial sales product configuration" is the base product sold in combination with the set of included features.

The "set of included features" are those features which, when added to the base product, provide the initial sales product configuration, or which, when combined with the set of feature upselling candidates, provide the product feature set.

The "set of feature upselling candidates" are a subset of the product feature set which, when held back for use in feature upselling efforts, provide the maximum profit potential with respect to sales of the initial sales product configuration and separate sales of the feature upselling candidates.

The "probability of sale" is the probability of selling one feature in the product feature set.

In various embodiments, feature partitioning is used to determine which features in the product feature set 116 are to be sold as part of an initial sales product configuration 124, and which features in the product feature set 116 are to be held back as feature upselling candidates 128. For an embedded system, this is restated as: which embedded software features should be pre-installed and delivered as part of a basic embedded system, and which features should be sold separately as part of a feature upselling mechanism?

It should be noted that embedded systems are described herein as only one possible product type that is amenable to feature partitioning. Thus embedded systems are discussed by way of example and not of limitation. Any product type that provides a base product and a set of optional features can be substituted in place of an embedded system, and thus, the various embodiments are not to be so limited. The methods, systems, and apparatus that can be used to accomplish feature partitioning will now be described.

When an embedded systems vendor determines their product structure, the decision is made as to which part of an embedded system's functionality is encapsulated as a set of features, and which functionality should remain as part of the basic ESW 112. Therefore, the first question for embedded systems developers in terms of partitioning embedded software is how to split ESW 110 into basic ESW 112 and ESW features feature_1 feature_2, . . . feature_n. Often, systems engineers decide on the division, since delineating between basic ESW and ESW features is usually determined by which functionality is desired for correct operation of the most basic embedded system, or base product 114, as part of the initial sales product configuration 124.

After determining how the fundamental division of ESW 110 will be made (e.g., between basic ESW 112 and the set of features feature_1, feature_2, . . . , feature_n), vendors decide which features (e.g., the basic ESW 112 and feature feature_1) are to be included in the initial sales product configuration 124, and which are kept back. Each feature that is not included in the initial sales product configuration 124 is a candidate for feature upselling, becoming a member in the set of feature upselling candidates 128.

The decision as to which features to include in the initial sales product configuration 124 of a partitioned system 120 can be significantly influenced by market conditions, including competing products offered for sale. Basic functionality is not usually sold by an embedded systems vendor as a separate feature. Rather, it is incorporated directly in the delivered embedded system.

For example, in the automotive product domain, a car manufacturer does not choose to sell fundamental indications of vehicle operational capability, such as oil and fuel levels, as separate features. Customers anticipate these features will be included in their new cars, and do not expect to pay additional money for them.

However, other features are considered optional by most automotive consumers. An example of feature upselling in this case might be the sale of a trip reporting system. A system which tracks data, such as mileage, GPS location, and travel times to generate reports may be of value to companies, but perhaps not so useful for individual persons.

To intelligently resolve the configuration problem in the realm of embedded systems then, one might use another way of determining how features will be divided to provide the initial sales product configuration. This can be summarized by asking: what software features, when combined, provide a profit-maximizing bundle of software features that can be delivered as part of an embedded system?

A naive approach to creating a profit-maximizing feature bundle would be to include no additional features in the delivered embedded system in order to generate maximum profit from feature upselling activities. Fewer software features equate to a reduced functional range of the embedded system, which most likely corresponds with a decreased product value. Since a product purchase is almost always evaluated with respect to available competing products, a minimalist approach, which includes no additional features, is usually not feasible.

The most profitable set of features can thus be constrained by conditions arising from the sale of competitors' products in the embedded systems market. A useful way to compare an embedded system to competing products involves assigning a utility value to each feature that can be offered with the system, as is known to those of ordinary skill in the art. Those readers that desire to know more about utility value assignment are referred to the Handbook of Utility Theory by S. Barbera, et al., Vols. 1 & 2, Springer, 2004.

A profit-maximizing strategy might be to provide as few features as possible with the initially delivered embedded system, but still incorporate enough features to deliver an embedded system that beats competing products in terms of functional range and quality. The fewer software features that are included, the more profit might be generated by selling the remaining features as part of feature upselling. To describe the problem in a realistic way, features should be weighted with their corresponding profit and the probability of selling the feature.

The profit of a feature is defined as the difference between its revenue and its cost. Revenues can be provided by price lists available from the vendor's sales division. Cost may be determined by the characteristics of software as a digital good, perhaps reflecting how expensive it is to integrate a feature into an embedded system. The probability of selling a feature comes from historical sales data and empirical studies of the underlying market. The probability value also reflects the willingness of customers to purchase the corresponding feature for a given price.

In some embodiments, the problem of partitioning a product feature set can formalized using equations, stated as a 0-1 knapsack problem, well-known to those of ordinary skill in the art. The 0-1 knapsack problem is a special case of integer programming (IP) where each decision variable is binary (compared to arbitrary integers in the IP problem), and derives its name from the maximization problem of choosing possible essentials with corresponding utilities that can fit into one bag (of maximum weight) to be carried on a trip. An overview of algorithms for solving knapsack problems is given in *Knapsack Problems: Algorithms and Computer Implementations*, by S. Martello, et al., John Wiley & Sons, 1990.

A binary decision variable $x_i$ (i=1, . . . , n) can be used to determine whether a given software feature i is included in the delivered embedded system or not. If $x_i$=1, then the feature is a candidate for future feature upselling efforts (e.g., features feature_2 . . . feature_n), otherwise it is incorporated in the delivered embedded system (e.g., basic ESW 112 and feature feature_1). The n-digit array of decision variables $(x_1, \ldots, x_n)$ describes which features are feature upselling candidates ($x_i=1$) and which are delivered as part of an embedded system ($x_i=0$).

The usefulness and/or desirability of an embedded system is determined, at least in part, by the set of incorporated software features. Thus, each feature i can be rated by its utility $u_i$ (i=1, ..., n). The utility of a feature in some embodiments is determined based on customer feedback and empirical usage data. In this context, the addressed connectivity of embedded systems in combination with a closed feedback loop between customers and vendors provides increased accuracy with respect to the assignment of utility values. Over time, utility values can be adjusted to reflect market developments and customer preferences.

The sum of all utilities for incorporated features (e.g., where $x_i=0$, or the set of included features represented by basic ESW 112 and feature feature_1), plus a basic utility $U_{basic}$ of the base product 114, add up to the utility of the delivered embedded system as the initial sales product configuration 124, depicted in formula [1]

$$U(x_1, \ldots, x_n) = U_{basic} + \sum_{i=1}^{n} (1-x_i) * u_i, \text{ with } x_i \in \{0,1\}. \quad [1]$$

Each software feature that is not included in the initial sales product configuration 124 is a candidate for future feature upselling efforts, and can generate additional revenue $r_i$ (i= 1, ..., n), with associated costs $c_i$ (i=1, ..., n).

The difference between the additional revenue and the costs for each feature in the product feature set provides the feature profit $z_i$ (i=1, ..., n). It should be noted that when $x_i=1$, (i.e., feature i is not part of the initial sales product configuration 124), the value $z_i$ refers only to a potential profit, since it is not known whether the feature will definitely be sold at a later point in time. However, to get an estimate of the profit of an embedded system, the probability of selling a feature as part of a feature upselling effort should be taken into account. Therefore, the random variable $Z_i$ is introduced in formula [2]:

$$Z_i(\omega) = \begin{cases} z_i, & \omega = \text{feature\_i\_sold} \\ 0, & \omega = \text{feature\_i\_not\_sold} \end{cases} \quad [2]$$

The introduced random variable has two outcomes: $z_i$ (profit for selling feature i), if the feature i is sold, and 0, if the feature is not sold. Together with the corresponding probabilities of each outcome, the expected value of the random variable $Z_i$ can be calculated. The expected value is the sum of the probability of each possible outcome multiplied by its payoff value. Thus, $p_i$ denotes the probability that a feature i will be sold during feature upselling efforts, while $\bar{p}_i$ is the probability that the feature will not be sold. The expected value of $Z_i$, which is the expected profit of feature i, is therefore $E(Z_i)=z_i*p_i+0*\bar{p}_i=z_i*p_i$. If a feature i is a feature upselling candidate, the variable $x_i=1$. Therefore, the expected profit is multiplied by $x_i$. If the basic profit $Z_{basic}$ of selling an embedded system is considered, the overall profit $Z(x_1, \ldots, x_n)$ for selling the initial sales product configuration 124 can be calculated as shown in formula [3]:

$$Z(x_1, \ldots, x_n) = Z_{basic} + \sum_{i=1}^{n} z_i * p_i * x_i, \text{ with } x_i \in \{0,1\} \quad [3]$$

The decision problem posed by partitioning the product feature set into a set of included features and a set of feature upselling candidates can be formalized as a 0-1 knapsack problem, where profit is maximized by choosing a particular set of feature upselling candidates to hold back from being sold as part of the initial sales product configuration.

Maximizing the profit by simply including zero additional features might not be feasible, because the product competes with others in the market. Thus, to beat the utility of competing embedded systems $U_{competitors}$ within the same application domain, additional features may be included in the initial sales product configuration 124. Of course, every additional feature included may decrease profit due to losing a feature upselling opportunity for that feature.

The challenge of maximizing profit in the initial sales product configuration 124, therefore, is a question of determining which features should be included in an embedded system at delivery time. The side condition is that the utility of the embedded system including the incorporated features be higher than the utility of competing embedded systems.

Table I describes the variables used in the statement of the feature partitioning problem, which is shown in formula [4].

$$\text{Maximize } F(x) = \sum_{i=1}^{n} (r_i - c_i) * p_i * x_i, \quad [4]$$

subject to $$\sum_{i=1}^{n} u_i * x_i \leq (U_{ownsystem} - U_{competitors}),$$

where $x_i \in \{0,1\}$ and $i=1, \ldots, n$.

Formula [4], stated as a 0-1 knapsack problem, can be solved using a branch and bound algorithm, known to those of ordinary skill in the art.

TABLE I

| Type | Name | Variable | Description |
|---|---|---|---|
| Decision variable | | $x_i$ | Determines whether feature i is a feature upselling candidate |
| Parameter | Competitor utility | $U_{competitors}$ | Utility of a competing product sold in the same application domain |
| Parameter | Base product with product feature set utility | $U_{ownsystem}$ | Utility of the base product sold with the entire product feature set |

TABLE I-continued

| Type | Name | Variable | Description |
|---|---|---|---|
| Parameter | Revenue for feature i | $r_i$ | Additional revenue gained by feature upselling feature i |
| Parameter | Costs for feature i | $c_i$ | Costs of making feature i available for sale |
| Parameter | Probability of sale for feature i | $p_i$ | Probability of selling feature i as part of a feature upselling effort |
| Parameter | Utility for feature i | $u_i$ | Additional utility gained by incorporating feature i |

The difference $U_{ownsystem} - U_{competitors}$ describes how much better the proposed initial sales product configuration is compared to competing products if the complete set of features is incorporated. If this difference is negative, there is no available solution. This outcome is reasonable, because if an initial sales product configuration that includes all features in the product feature set has less utility than competing embedded systems, holding back features for future upselling would likely not be an effective way to market the product.

Thus, the difference $U_{ownsystem} - U_{competitors}$ is the window of opportunity for product vendors to designate features for feature upselling opportunities. The sum of products $$\sum_{i=1}^{n} u_i * x_i$$

expresses the accumulated utility of all feature upselling candidates, which is missing in the delivered embedded system. This value should not exceed the value of the difference $U_{ownsystem} - U_{competitors}$ with respect to configuring products to be sold against competing products.

The embodiments described are useful when product comparisons are made within substantially the same price range. If prices differ by a large amount, utility values may also differ widely. This situation may lead to the optimal solution for a company that has a superior, but more expensive product, to keep back all available features and use them for feature upselling opportunities.

A simplified example of the various mechanisms described herein, as applied to the automotive domain, will now be presented. The example assumes that partitioning of features for an in-car electronic system will be accomplished. Here, two features identified during the feature determination activity for an automobile as the base product are a backup camera system (feature_1) and a GPS system (feature_2). Data from the company sales division shows that the revenue for selling the backup camera system is $400 USD, with a probability of 0.6 to sell it as part of a feature upselling effort. The GPS system generates revenue of $350 USD, with a probability of 0.8 to sell it as part of a feature upselling effort. The costs for the backup camera system and the GPS system are $75 USD and $125 USD, respectively.

Based on customer feedback and usage-data coming from other embedded in-car electronic systems that have been sold, an estimate for the utility of the backup camera system is 23, while the utility of the GPS system is 18. The utility of competing in-car electronic systems in the same category of automobiles is estimated to be 65, while the overall utility of the company's system (including the complete feature set) is 100. As a part of this example, it is assumed that each of these utility values is proportional to the other utility values. Using the given input data, the 0-1 Knapsack problem can be stated as shown in formula [5].

Maximize $F(x_1, x_2) = (400-75)*0.6*x_1 + (350-125)*0.8*x_2$, subject to $23*x_1 + 18*x_2 \leq (100-65)$ where $x_1, x_2 \in \{0,1\}$. [5]

FIGS. 2 and 3 illustrate a listing 200 of code and data that can be used to partition product features according to various embodiments. Here the listing 200 includes code that is used to solve the problem as stated using a branch and bound algorithm executed using off-the-shelf software, such as Xpress-MP Suite software, available from Fair Isaac Corporation of Northants, United Kingdom. The 0-1 knapsack problem can be formulated using the Xpress-Mosel model building and development tool, and solved using the Xpress-Optimizer solver engine. Each of these software tools are part of the Xpress-MP Suite software package.

As can be seen in FIG. 2, the code in the listing 200 models the problem in a substantially generic way using the Mosel language. Data can be fed into the model using the data file 204. A variety of variables 208 can be initialized to represent the number of features in the product feature set, the utility of competing products, and the utility of an initial sales product configuration that includes all of the features in the product feature set. Other initialized variables include a series of arrays that contain values related to individual features in the product feature set, including a revenue array 212, a cost array 216, an array 220 to account for the probability of selling features when then are held back to become part of a feature upselling effort, a utility array 224, and an array of the corresponding set of decision variables 228.

FIG. 3 continues the listing 200 that begins in FIG. 2. In FIG. 3, the profit function 304 and side condition 308 are set forth. The identified input data 324 feeds the solver engine from a separate data file 300.

For the automotive domain example, the Xpress-Optimizer software calculated and designated a maximum possible profit 316 through feature upselling of $195 USD, with the decision variables 320 designated as feature_2 (the GPS system) being an included feature, and feature_1 (the backup camera system) held back as a feature upselling candidate. Thus, the optimal solution in this example is to include the GPS system in the delivered in-car electronic system, while keeping back the backup camera system for sale during a later feature upselling effort.

The solution in this example can be verified. The window of opportunity for an embedded systems vendor to designate features for feature upselling is 100−65=35 (the utility difference between the proposed embedded system including all features, and a competing embedded system). The utility of the feature upselling candidate is 23, which undershoots the window of opportunity, while the decision to keep both features as upselling candidates exceeds it. At the same time, the backup camera system provides a higher estimated profit of ($400 USD−$75 USD)*0.6=$195 USD compared to the ($350 USD−$125 USD)*0.8=$180 USD of the GPS system.

The solution of the feature partitioning problem can be extended to account for competing products selling within a different price range, and/or at a different time. This means that changing market conditions and input data can be taken into account and used to vary the partition results over time. In some embodiments, the synergistic inter-relationship between features is also considered. Thus, many embodiments may be realized.

Figure 4:
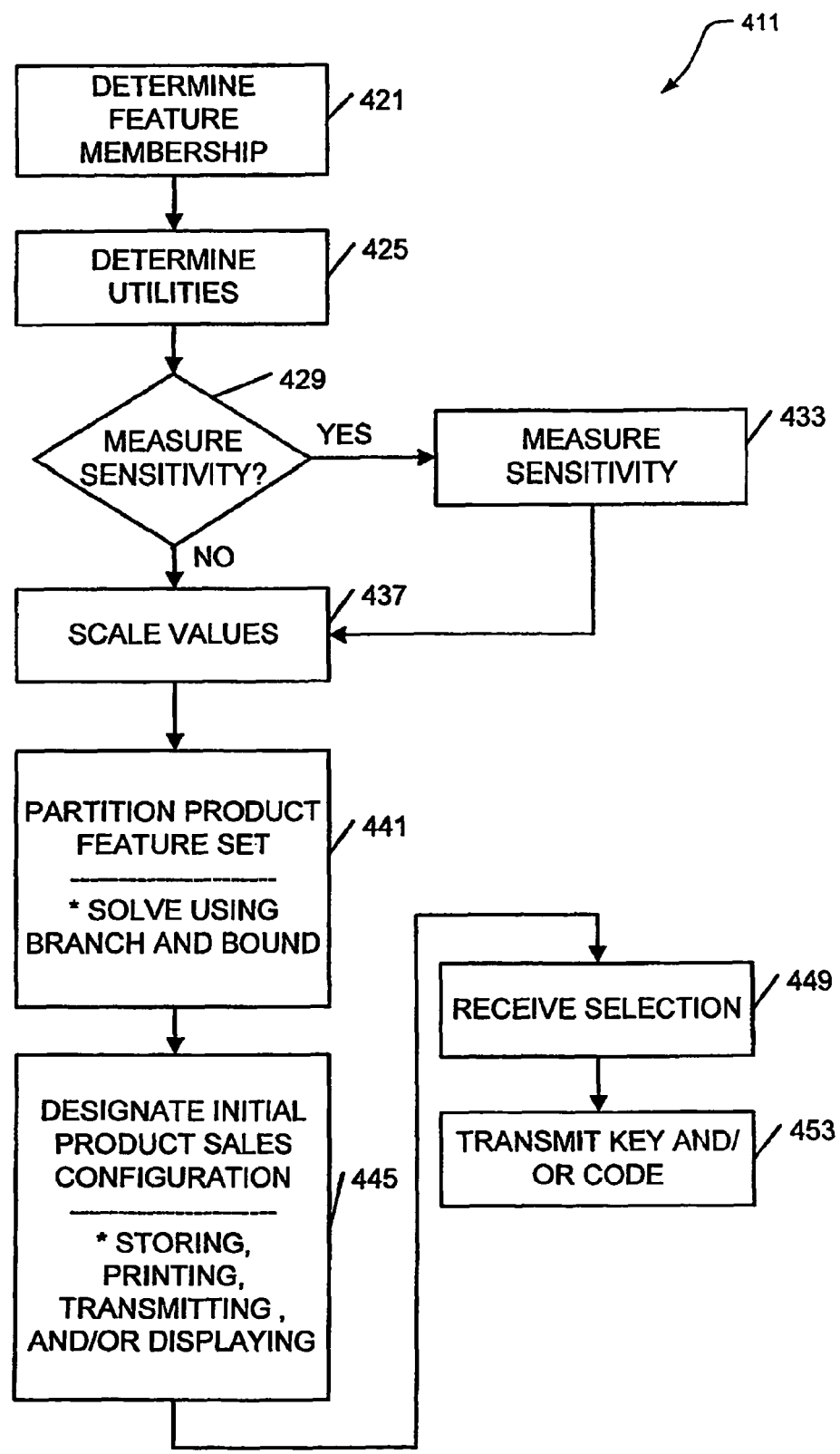
FIG. 4 is a flow diagram illustrating methods of partitioning product features according to various embodiments.

For example, FIG. 4 is a flow diagram illustrating methods 411 of partitioning product features according to various embodiments. The methods 411 are implemented in a machine-accessible and readable medium, and are operational over processes within and among networks. The networks may be wired, wireless, or a combination of wired and wireless. The methods 411 may be implemented as instructions, which when accessed by a machine, perform the processing depicted in FIGS. 1-3. Given this context, event resolution is now discussed with reference to FIG. 4.

In some embodiments, a computer implemented method 411 to partition a product feature set begins (optionally) at block 421 with determining feature membership in the product feature set. Thus, prior to the activity of partitioning, the set of all features available for partitioning between the set of included features and the set of feature upselling candidates can be determined. The set of included features can be combined with a base product, which in some embodiments might comprise one or more of a cellular telephone, a digital camera, or a computer, for example. This combination is then offered for sale as the initial product sales configuration.

The method 411 may go on to block 425 with determining utilities of members in the product feature set. The utilities may be determined as cardinal utilities, or ordinal utilities, among others, as is known to those of ordinary skill in the art. Cardinal utilities may be useful when the relative magnitudes of the utilities to be determined are intended to be proportional to each other.

In some embodiments, the method 411 may include measuring sensitivity of various parameters to the change in the price and/or utility of competing products. For example, if sensitivity is to be measured, as determined at block 429, then the method 411 may continue at block 433 with measuring the sensitivity of one or more parameters associated with individual features in the product feature set with respect to changes in the price of the competing product or the utility of the competing product. The parameters may include additional revenue to be derived from selling the feature $r_i$, the cost of producing the feature $c_i$, the probability of its being sold $p_i$, and/or the utility of the feature $u_i$.

Those of ordinary skill in the art are familiar with sensitivity analysis of this type. For example, Monte Carlo statistical methods can be used to determine the effects of the uncertainty on certain parameters related to fluctuations in one or more factors (e.g., price and/or utility) that have a known probability distribution. Readers that desire to learn more about the subject are encouraged to consult one of the many available references, including *Probabilistic Sensitivity Analysis Using Monte Carlo Simulation. A Practical Approach* by P. Doubilet, et al., Med. Decis. Making, pp. 157-77, Summer 1985.

Whether or not parameter sensitivity is measured, the method 411 may include, at block 437, with scaling some of the parameters. For example, if the sensitivity is measured, the activities at block 437 may include scaling one or more of the additional revenue, the cost, the probability of sale, or the utility of at least one of the features in the product feature set when the sensitivity exceeds a selected threshold value. In this case, the activity at block 437 may also include recalculating the profit function (used for partitioning the product feature set in block 441). Thus, the profit function can be revised when at least one of the factors exhibits a desired degree of sensitivity to changes in the price or utility of a competing product.

Even if sensitivity is not measured, scaling of some parameter values may occur as part of the activity in block 437. For example, in some embodiments, the method 411 may include scaling one or more of the additional revenue or the probability of sale according to the price of the competing product. This may be used to adjust the formula [4] to accommodate analyses where the price of a competing product is not in the same range as the initial sales product configuration.

In some embodiments, one or more of the additional revenue, the cost of producing, the probability of sale, or the utility of at least one of the features in the product feature set is scaled according to a selected future time period. This may be used when it is desired to adjust the action of formula [4] to accommodate changes in parameters that are expected to occur over time.

In some embodiments, one or more of the additional revenue, the probability of sale, or the utility of at least one of the features in the product feature set is scaled according to membership in a complimentary subset of the product feature set. Thus, the formula [4] can also be adjusted to accommodate complementary interaction between certain sets of features.

For example, the combined utility of a faster processor and larger memory in a computer may be much greater than would be expected by simply adding the individual utilities of the two features that is obtained when each is separately implemented. Feature bundling may also be used to adjust the sales price, and when the price of a feature is adjusted as part of feature bundling, the change in price may be reflected as a change in additional revenue for the features involved.

The method 411 may continue on to block 441 with partitioning a product feature set into a set of included features and a set of feature upselling candidates determined by a corresponding set of decision variables, as described previously. The corresponding set of decision variables can be determined by maximizing a profit function comprising a sum of first mathematical products over the product feature set. The first mathematical products include profit multiplied by probability of sale multiplied by one of the set of decision variables for each feature of the product feature set.

The profit included in each of the first mathematical products may comprise additional revenue realized upon selling one of the features included in the product feature set minus a cost of producing that feature. The corresponding set of decision variables may comprise an array (e.g., a vector) of binary variables having values indicating which ones of the product feature set form the set of included features, and which should be selected as the feature upselling candidates.

A side condition may be imposed on maximizing the profit function, wherein a sum of second mathematical products over the product feature set is less than or equal to the utility of the product feature set minus the utility of a competing product. The second mathematical products include utility multiplied by one of the set of decision variables for each feature of the complete feature set.

Thus, in many embodiments, the product feature set can be partitioned into a set of included features and a set of feature upselling candidates determined by a corresponding set of decision variables. The decision variables can be determined, in turn, by maximizing a profit function of profit, probability of sale, and the set of decision variables for each feature of the product feature set, subject to the condition that a function of utilities and the set of decision variables for each feature of the product feature set is less than or equal to a utility of the product feature set combined with a base product, minus a utility of a competing product.

When partitioning the product feature set, one way to solve the maximization problem presented by maximizing the profit function subject to the side condition determined by the utility of the competing product is by using a branch and bound algorithm. An optimal solution may also be reached using dynamic programming approaches, including those based on a recursive definition of the problem. See, for example, *Dynamic Programming* by D. Wagner, The Mathematica Journal, Vol. 5, Issue 4, pp. 42-51, 1995.

The method 411 may go on to block 445 with designating an initial sales product configuration as a combination of the base product and the set of included features. Designating may comprise one or more of storing, printing, transmitting, or displaying the initial sales product configuration. Each form of designation may be useful in a variety of contexts, including the use by a marketing department to rapidly determine, view, and/or communicate which features should be included with a particular base product to form the initial sales product configuration, while satisfying the goal of generating maximum profit via feature upselling efforts.

In some embodiments, the method 411 may include, at block 449, receiving a selection of at least one of the set of feature upselling candidates (perhaps from a consumer that has already purchased the initial product sales configuration and wishes to upgrade their purchase). The selection may be received over the Internet at a vendor server, for example.

The method 411 may go on to block 453 to include transmitting at least one license key or code (e.g., downloading code) associated with the selection to enable activating the selected feature upselling candidate(s). In this way, features forming part of a set of feature upselling candidates can be quickly and inexpensively activated, so that consumers can upgrade the initial product sales configuration as desired. This activity may occur as part of a commercial transaction to purchase the selection, for example, or as a reward for certain actions undertaken by the consumer on behalf of the vendor.

Figure 5:
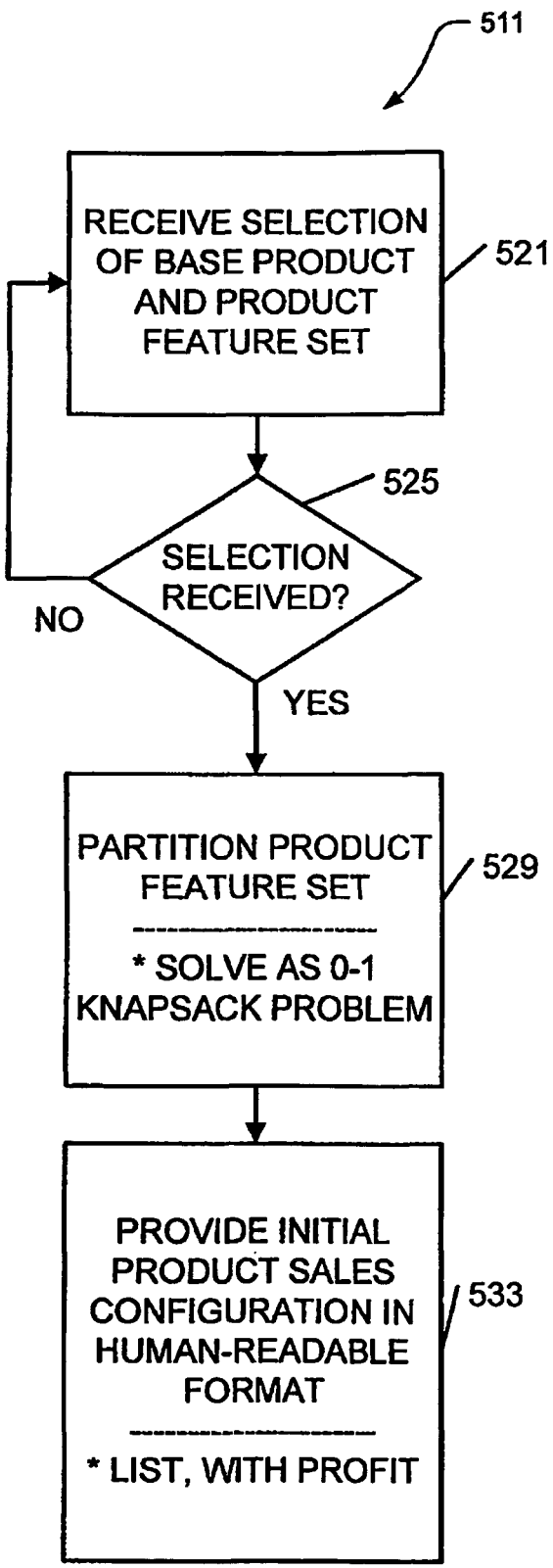
FIG. 5 is a flow diagram illustrating additional methods of partitioning product features according to various embodiments.

FIG. 5 is a flow diagram illustrating additional methods 511 of partitioning product features according to various embodiments. The methods 511 are implemented in a machine-accessible and readable medium, and are operational over processes within and among networks. The networks may be wired, wireless, or a combination of wired and wireless. The methods 511 may be implemented as instructions, which when accessed by a machine, perform the processing depicted in FIGS. 1-4. Given this context, the process of partitioning a product feature set in the embedded system context is now discussed with reference to FIG. 5.

A computer implemented method 511 of partitioning a product feature set, oriented toward a product that includes embedded software, such as a cellular telephone, a software-defined radio, a computer, or any other device that is capable of executing instructions, may comprise receiving a selection of a base product comprising an embedded software product, and a product feature set associated with the base product, wherein the product feature set includes a set of software upgrade components at block 521.

If the selection has not been received, as determined at block 525, then the method 511 may return to block 521. However, if the selection has been received, then the method 511 may continue on to block 529 with partitioning the product feature set into a set of included features and a set of feature upselling candidates in any of the ways described previously. The activity at block 529 may include solving a maximization problem in the form of a bounded 0-1 knapsack problem presented by maximizing the profit function subject to a side condition determined by the utility of the competing product.

The method 511 may go on to include, at block 533, providing an initial sales product configuration in a human readable format as a combination of the base product and the set of included features. The human readable format may comprise any number of format arrangements, such as a list including the base product, the set of included features, and the set of feature upselling candidates kept back from being sold with the base product. A list of this type would be something that marketing personnel could easily read to determine what features should be sold as part of the initial product sales configuration, and what features should be held back to take advantage of feature upselling opportunities. The human readable format might also comprise the value of the profit function, as shown in the automotive example described herein, so that the value of the maximized profit obtained is also displayed.

It should be noted that these methods 411, 511 are but two examples of how various embodiments described herein can operate, and they are given for purposes of illustration, and not limitation. Thus, many embodiments may be realized.

For example, those of ordinary skill in the art will realize that each of the method elements shown in FIG. 5 may be added to or substituted for any of the method elements shown in FIG. 4. Additionally, those of ordinary skill in the art will also realize that each of the method elements of FIGS. 4-5 may be combined with the other elements shown in a variety of ways, to form a variety of methods that use the elements from each of the figures in serial, parallel, looped, and/or repetitious fashion. Still further embodiments may be realized.

Figure 6:
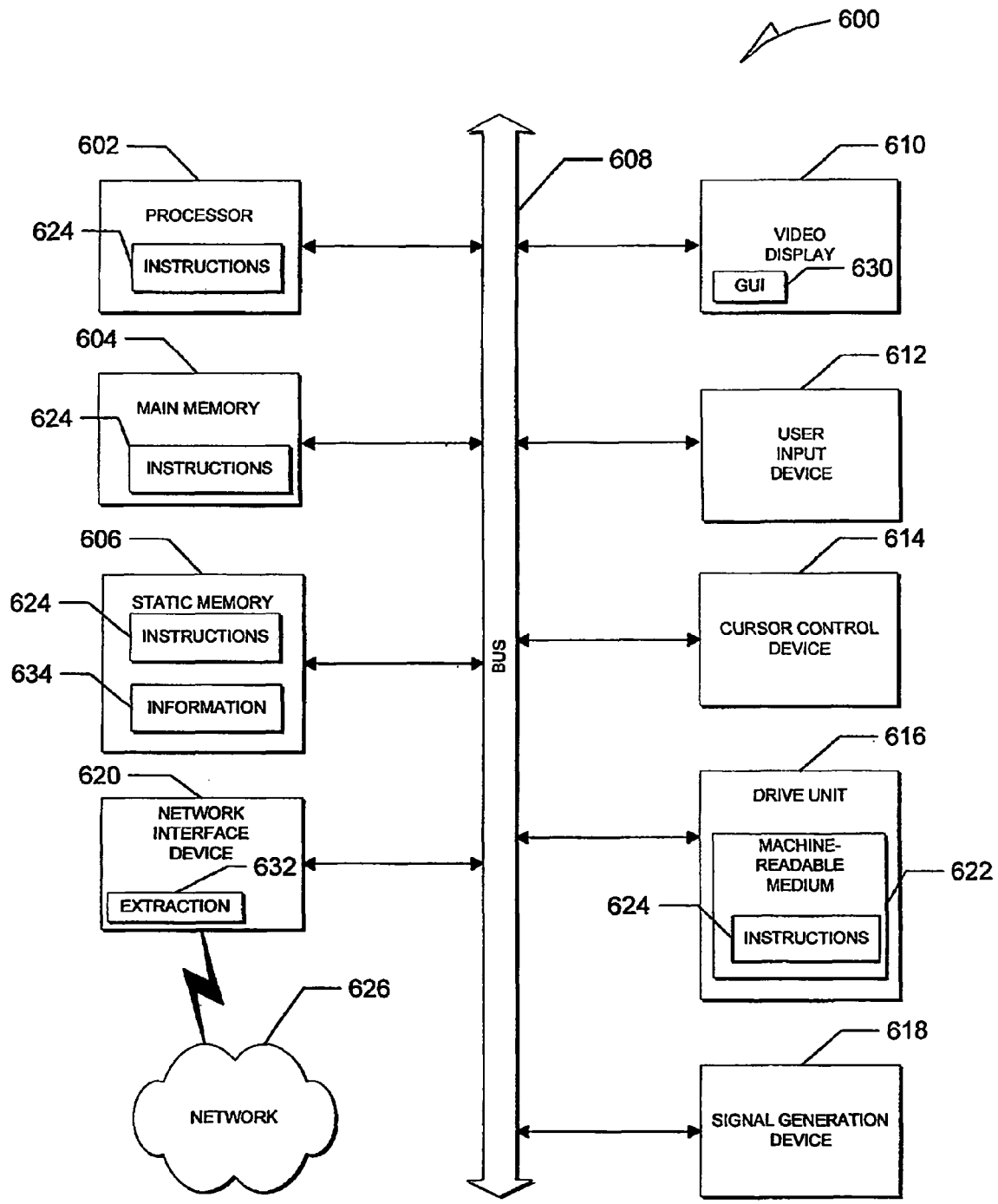
FIG. 6 is a block diagram of a machine in the example form of a computer system according to various embodiments.

For example, FIG. 6 is a block diagram of a machine in the example form of a computer system 600 according to various embodiments. The computer system may include a set of instructions 624 for causing the system 600 to perform any one or more of the methodologies discussed herein, including those illustrated in FIGS. 1-5.

In some embodiments, the system 600 may operate as a standalone device or may be connected (e.g., networked) to other machines. In a networked deployment, the system 600 may operate in the capacity of a server or a client machine in a server-client network environment, or as a peer machine in a peer-to-peer (or distributed) network environment.

The system 600 may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 600 may include a processor 602 (e.g., a central processing unit (CPU), a graphics processing unit (GPU) or both), a main memory 604 and a static memory 606, all of which communicate with each other via a bus 608. The system 600 may further include a video display unit 610 (e.g., liquid crystal displays (LCD) or cathode ray tube (CRT)). The display unit 610 may be used to display a GUI according to the embodiments described with respect to FIGS. 3-5. The system 600 also may include a user input device 612 (e.g., a keyboard, mouse, voice input recognition device, touch screen, touch pad, etc.), a cursor control device 614 (e.g., a mouse, trackball, or touch pad, among others), a disk drive unit 616, a signal generation device 618 (e.g., a speaker), and a network interface device 620.

The disk drive unit 616 may include a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the system 600, the main memory 604 and the processor 602 also constituting machine-readable media. The software 624 may further be transmitted or received over a network 626 via the network interface device 620, which may comprise a wired and/or wireless interface device.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments. The term "machine-readable medium" shall accordingly be taken to include tangible media that include, but are not limited to, solid-state memories, optical, and magnetic media. Thus, additional embodiments may be realized.

For example, a system 600 may comprise a graphical user interface (GUI) module 630, perhaps included as part of the instructions 624, or as some combination of software/firmware/hardware in the video display 610, to receive, as entry data (e.g., perhaps from the user input device 612, or as part of the information 634 stored in the static memory 606), utility values, probability of sale values, and profit values for a product feature set associated with a base product. Thus, a user input device 612 or any one of the memory devices (memories 604, 606, 616) can be used to provide the utility values, the probability of sale values, and the profit values, among other parameters. The GUI 630 can be used to display an initial sales product configuration as a combination of the based product and a set of included features, once these are partitioned. Thus, in most embodiments, the system 600 includes a processor 602 to process the entry data to partition the product feature set into the set of included features and a set of feature upselling candidates determined by a corresponding set of decision variables, in any of the ways described previously.

In some embodiments, the system 600 includes an extraction module 632 to determine profit values by extracting, from another module (e.g., a sales module forming part of the information 634 stored in the static memory 606, or from another program or database (not shown) coupled to the network 626), additional revenue realized upon selling one of the features in the product feature set less a cost of producing that feature. This may provide a completely automated way to access any one of the various parameters used as part of the partitioning process.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

In conclusion, it can be seen that the various mechanisms used to partition a product feature set presented herein provide an easily accessible way to determine how the product feature set should be partitioned to generate maximum profit when feature upselling opportunities are present. This capability may operate to increase the profits realized by a variety of wholesale and retail organizations, as well as to provide a more interesting and competitive market environment.

Embodiments can be implemented in a variety of architectural platforms, operating and server systems, devices, systems, or applications. Any particular architectural layout or implementation presented herein is thus provided for purposes of illustration and comprehension only, and is not intended to limit the various embodiments.

The Abstract of the Disclosure is provided to comply with 37 C.F.R. § 1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:

partitioning various selections of product features, chosen from a set of product features, into respective combinations of possible included feature sets and complementary possible upselling feature sets, respective possible included feature sets being combined with a base product and considered for inclusion in an initial sales product configuration;

for each possible upselling feature set, calculating, using at least one processor, a positive utility threshold as a summation of a utility of each product feature of a respective possible upselling feature set that is less than or equal to the combination of the base product utility and the product feature set utility minus a competitive product feature set utility;

for each possible upselling feature set having a positive utility threshold, calculating a sales profit corresponding to a sale of the respective possible upselling feature set; and ascertaining a maximum sales profit from among the sales profits calculated for the possible upselling feature sets having a positive utility threshold, wherein the possible included feature set and the complementary possible upselling feature set having the maximum calculated sales profit are respectively designated as a set of included features to be included in the initial sales product configuration and a set of upselling feature candidates correlated with the initial sales product configuration.

2. The method of claim 1, wherein:
calculating the sales profit of respective possible upselling feature sets further comprises using the at least one processor to determine the sales profit according to the formula:

$$f(x) = \sum_{i=1}^{n} (r_i - c_i) * p_i * x_i;$$

wherein f(x) is the sales profit and each product feature is indexed according to an indicator i, such that, $r_i$, is an amount of revenue due to the product feature sale, $c_i$, is the product feature production cost, $p_i$, is the probability of the product feature sale, n is the number of product features in the set of product features, $x_i$, is an indicator of inclusion of the product feature in the possible upselling feature set, $x_i$, being 1 or 0, where 1 denotes inclusion and 0 denotes exclusion.

3. The method of claim 1, further comprising:
designating the initial sales product configuration to include the base product and the set of included features that matches the complementary set of upselling feature candidates having the maximum sales profit.

4. The method of claim 1, further comprising:
receiving a selection of at least one feature of the set of upselling feature candidates; and
transmitting at least one of a license key or a code associated with the selection to enable activating the at least one feature of the set of upselling feature candidates.

5. The method of claim 1, further comprising:
measuring a sensitivity of one or more parameters associated with individual features in the set of product features with respect to one of changes in a price of a competing product or a change in the utility value of the competing system product.

6. The method of claim 1, further comprising:
scaling a parameter of at least one feature of the set of product features when a sensitivity of one or more parameters associated with individual features in the set of product features exceeds a predetermined threshold value; and
recalculating respective sale profits according to the mathematical product.

7. The method of claim 6, wherein the parameter is at least one of the probability of selling, the utility value, an additional revenue, or a cost.

8. The method of claim 1,
wherein the entire system product includes a base product plus the set of product features and
wherein the utility value of the entire system product includes a utility value of the base product and the sum of all utility values for the respective features in the set of product features.

9. The method of claim 1, wherein each feature of the set of product features is included in one of the set of included features and the set of upselling feature candidates.

10. The method of claim 1, wherein sales profits are the difference between sales revenue and a cost of production and implementation of a feature of the set of product features.

11. A non-transitory computer-readable storage medium embodying a set of instructions, that when executed by at least one processor, causes the at least one processor to perform operations comprising:

partitioning various selections of product features, chosen from a set of product features, into respective combinations of possible included feature sets and complementary possible upselling feature sets, respective possible included feature sets being combined with a base product and considered for inclusion in an initial sales product configuration;
for each possible upselling feature set, calculating, using at least one processor, a positive utility threshold as a summation of a utility of each product feature of a respective possible upselling feature set that is less than or equal to the combination of the base product utility and the product feature set utility minus a competitive product feature set utility;
for each possible upselling feature set having a positive utility threshold, calculating a sales profit corresponding to a sale of the respective possible upselling feature set; and
ascertaining a maximum sales profit from among the sales profits calculated for the possible upselling feature sets having a positive utility threshold,
wherein the possible included feature set and the complementary possible upselling feature set having the maximum calculated sales profit are respectively designated as a set of included features to be included in the initial sales product configuration and a set of upselling feature candidates correlated with the initial sales product configuration.

12. The non-transitory computer-readable storage medium of claim 11, wherein:
calculating the sales profit of respective possible upselling feature sets further comprises executing at least a portion of the instructions to determine the sales profit according to the formula:

$$f(x) = \sum_{i=1}^{n} (r_i - c_i) * p_i * x_i;$$

wherein f(x) is the sales profit and each product feature is indexed according to an indicator i, such that, $r_i$, is an amount of revenue due to the product feature sale, $c_i$, is the product feature production cost, $p_i$, is the probability of the product feature sale, n is the number of product features in the set of product features, $x_i$, is an indicator of inclusion of the product feature in the possible upselling feature set, $x_i$, being 1 or 0, where 1 denotes inclusion and 0 denotes exclusion.

13. The non-transitory computer-readable storage medium of claim 11, the operations further comprising:
designating the initial sales product configuration to include the base product and the set of included features that matches the complementary set of upselling feature candidates having the maximum sales profit.

14. The non-transitory computer-readable storage medium of claim 11, the operations further comprising:
receiving a selection of at least one feature of the set of upselling feature candidates; and
transmitting at least one of a license key or a code associated with the selection to enable activating the at least one feature of the set of upselling feature candidates.

15. The non-transitory computer-readable storage medium of claim 11, the operations further comprising:
measuring a sensitivity of one or more parameters associated with individual features in the set of product features with respect to one of changes in a price of a competing product or a change in the utility value of the competing system product.

16. The non-transitory computer-readable storage medium of claim 11, the operations further comprising:
    scaling a parameter of at least one feature of the set of product features when a sensitivity of one or more parameters associated with individual features in the set of product features exceeds a predetermined threshold value; and
    recalculating respective sale profits according to the mathematical product.

17. The method of claim 16, wherein the parameter is at least one of the probability of selling, the utility value, an additional revenue, or a cost.

18. The non-transitory computer-readable storage medium of claim 11,
    wherein the entire system product includes a base product plus the set of product features and
    wherein the utility value of the entire system product includes a utility value of the base product and the sum of all utility values for the respective features in the set of product features.

19. The non-transitory computer-readable storage medium of claim 11, wherein each feature of the set of product features is included in one of the set of included features and the set of upselling feature candidates.

20. The non-transitory computer-readable storage medium of claim 11, wherein sales profits are the difference between sales revenue and a cost of production and implementation of a feature of the set of product features.

21. A system, comprising:
    a product partitioning server configured to segregate a set of product features of a system into a set of included features within an initial sales product configuration and a set of upselling feature candidates;
    a product feature data storage module configured to store feature data associated with product sales and configurations;
    a calculating module configured to calculate a sales profit corresponding to a sale of respective possible upselling feature sets and a positive utility threshold as a summation of a utility of each product feature of a respective possible upselling feature set that is less than or equal to the combination of the base product utility and the product feature set utility minus a competitive product feature set utility;
    a configuring module configured to arrange product features into sales configurations;
    a measuring module configured to measure parameters associated with individual features in the set of product features; and
    a scaling module configured to scale a property associated with a feature of the set of product features.

22. The system claim 21, wherein:
    the calculating module being configured to calculate the sales profit of respective possible upselling feature sets using the formula:

$$f(x) = \sum_{i=1}^{n} (r_i - c_i) * p_i * x_i;$$

wherein f(x) is the sales profit and each product feature is indexed according to an indicator i, such that, $r_i$, is an amount of revenue due to the product feature sale, $c_i$, is the product feature production cost, $p_i$, is the probability of the product feature sale, n is the number of product features in the set of product features, $x_i$, is an indicator of inclusion of the product feature in the possible upselling feature set, $x_i$, being 1 or 0, where 1 denotes inclusion and 0 denotes exclusion.

23. The system of claim 21, wherein
    the measuring module measures a sensitivity of one or more parameters associated with individual features in the set of product features with respect to one of changes in a price of a competing product or a change in a utility value of a competing system product.

24. The system of claim 21, wherein the scaling module scales a parameter of at least one feature of the set of product features when a sensitivity of the parameter exceeds a predetermined threshold value.

* * * * *